May 3, 1960 — R. T. CLOUD — 2,934,991
TERRAIN METER
Filed Jan. 16, 1958
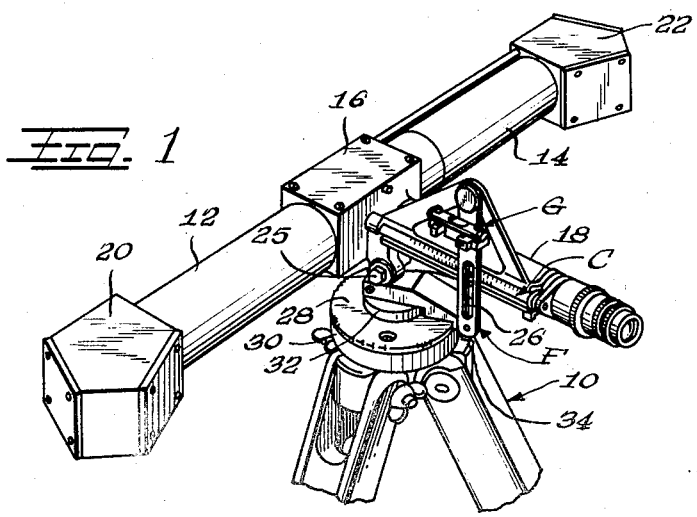
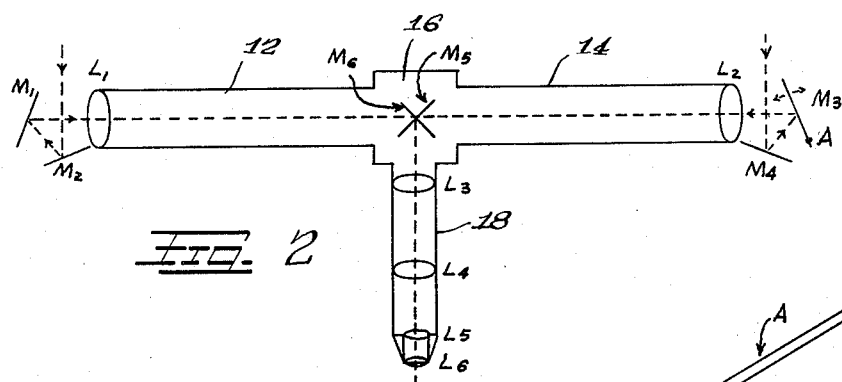
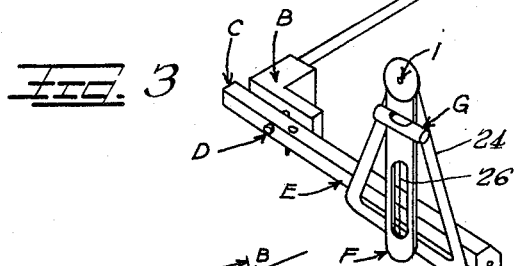
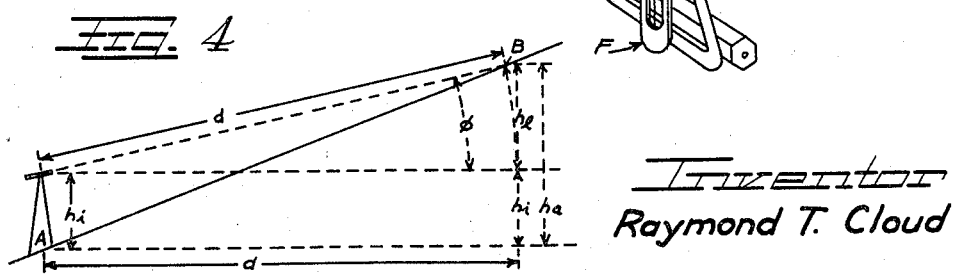
Inventor
Raymond T. Cloud
By Hill, Sherman, Meroni, Gross & Simpson  Attys

United States Patent Office 2,934,991
Patented May 3, 1960

2,934,991

TERRAIN METER

Raymond T. Cloud, Houston, Tex., assignor to Mandrel Industries, Inc., Houston, Tex., a corporation of Michigan Application January 16, 1958, Serial No. 709,276

2 Claims. (Cl. 88—2.7)

This invention relates to a terrain meter for gravity meter corrections and more particularly, to an instrument for correcting the effect of topographical variation adjacent to the position where a gravity reading is made in a manner which is useful in determining the location of oil deposits.

The force of gravity at the surface of the earth is known to vary in accordance with several factors. One such factor is the ovoid shape of the earth itself, which produces an increase in the force toward the poles. Another is the height of the area above sea level, the gravitational force being less at greater altitudes.

A third factor is the variation in gravitational force which occurs with variations in mass densities near the surface of the earth. This factor is important in finding oil, and these anomalies in mass densities, taken in relation to their depth below the surface of the earth, are determined by making several corrections which include: the height above sea level at which a reading is being taken, called the free air correction; the density of material between the station of the reading and the sea level base, called the Bouguer correction; and a correction to compensate for the effect of land surfaces which are higher and lower than the surface where the reading is being made. If such variations in topography are not taken into consideration, in proportion to their distances from the reading point, the final gravity reading at a given point cannot be usefully compared with the other gravity readings in the vicinity.

The free air correction and the Bouguer correction are standard linear functions which are combined and multiplied by the elevation differences. However, the correction for topographical variation immediate to the station point has occasioned considerably more difficulty than the first two corrections. Heretofore, accurate topographic maps having small interval contours, or similar tedious and complex surveys, have been required. The theory and calculations for terrain corrections are known, but though tables and mathematical methods greatly facilitate the computation of terrain corrections, they do not eliminate the need for topographic maps or surveys or the need for a multiplicity of calculations.

According to the present invention the labor of obtaining terrain corrections may be considerably reduced by means of an instrument herein referred to as a terrain meter. Generally in principle the terrain adjacent to the station where a reading is taken is considered as being divided into equally spaced three dimensional "compartments" around the entire 360° at the station. The size of these compartments is calibrated in accordance with the reduction in gravitational effects as distance from the station is increased. The base area of the compartments near the station is small, but is larger for compartments at greater distances from the station. Likewise, the heights of the various compartments are calculated in increments which correspond with unit increments in gravitational effects. For example, according to one method a first ring of compartments is chosen which comprises four equal compartments at an average distance of 30.58 feet from the station and an average elevation of 5.35 feet, and successive concentric rings are selected having six, eight and twelve compartments, respectively, of increasing size relative to the first compartments. The corrections thus obtained are added to the observed readings as previously corrected for elevation. In the present invention, differences in elevation are determined in locations corresponding to the divisions referred to above, but the elevations are used to indicate directly the corrections to be made in the gravity reading.

The instrument of the invention utilizes a system of mirrors and lenses in the form of a coincidence range finder, which is calibrated so that when it is adjusted for a given zone of compartments, an object which is placed at the midpoint in that zone will appear in an upper and lower position in the view as seen from the eyepiece. Index means are provided which adjust one of the mirrors of the instrument to any one of the predetermined distances, and which carry correction indicia for the range of elevations at such distance, a specific correction being determined by level means on the instrument. The instrument is rotatably mounted on a spindle plate which is divided so as to provide equally spaced settings of the proper number for each zone (e.g., four for the first zone, etc.) so that a predetermined number of elevation readings and corrections may be made for each zone. The sum of the corrections thus made will be then added to the gravity reading made as hereinbefore described.

It is therefore, an object of the present invention to provide a meter for mechanically determining corrections to be made to gravity readings in accordance with the contour of land adjacent to the point where a reading is to be made.

Another object of the invention is to provide an instrument of the type described in which index means are provided for each of a predetermined set of distances from the station at which a reading is to be made and level means are used in co-operation with the index means to afford a correction reading in accordance with specific elevations at such distances without the necessity of elaborate calculations.

Another object of the invention is to provide an instrument as described in which spindle means are used in co-operation with the aforementioned index and level means so that a predetermined number of readings may be made for each predetermined distance from the instrument, taken at equally spaced angular intervals, to obtain a set of readings for each zone which may be added together to determine the total correction required for the terrain.

Another object of the invention is to provide an instrument as described in which adjustment of the index means to set the instrument for a specific predetermined distance from the instrument automatically serves to adjust the image in the eyepiece of the instrument so as to produce a correct setting for that distance.

Another object of the invention is to provide an instrument as described having a minimum of part to be adjusted and which requires little or no special training for its correct operation.

Other objects and advantages of the invention will become apparent as the description proceeds in accordance with the drawings in which:

Figure 1 is a perspective view of a terrain meter for gravity meter corrections in accordance with the present invention;

Figure 2 is a diagrammatic view of the instrument disclosing the arrangement of lenses and mirrors thereof;

Figure 3 is a perspective, simplified view of the portion of the instrument of the invention which adjusts for predetermined distances, provides calibrated readings in accordance with the distance set and affords adjustment to determine the specific reading in accordance with the level of the terrain cited;

Figure 4 is a diagrammatic showing of the geometric relationships involved in the determination of a given correction.

Referring to Figs. 1 through 3 an instrument 10 of the general type of coincidence range finder is shown in accordance with the present invention, comprising a pair of telescopes 12 and 14 of equal size which are disposed coaxially in open ended relation to each other by means of a retaining box 16. Each of the telescopes is provided at its outer end with lenses $L_1$ and $L_2$ respectively, and an eye piece 18 is disposed in perpendicular relation to the telescopes 12 and 14 as engaged in the retaining box 16. The eye piece 18 includes a plurality of lenses $L_3$, $L_4$, $L_5$ and $L_6$, as will be understood by those skilled in the art, and each of the telescopes 12 and 14 is equipped to receive light parallel to the eye piece 18 by means of a penta mirror system supported in housings 20 and 22 respectively. The mirror system in housing 20 consists of a pair of mirrors M1 and M2 set to receive light from the object being sighted and to direct the light at an angle of 90° to the angle of incidence along the telescope 12. Correspondingly, the housing 22 contains a penta mirror system consisting of mirrors M3 and M4 which are set to deflect light received from the direction of sighting at right angles and into the telescope 14. The mirrors M1 through M4 are used in the usual manner for range finders except for the fact that the mirror M3 is hinged as hereinafter further described so that it may be displaced by a small angle in accordance with the distance for the sighting. So as to deflect light from the telescopes 12 and 14 into the eye piece 18, a pair of mirrors M5 and M6 are mounted one above the other in the retaining box 16 so that when the mirror M3 is adjusted for the said desired distance the observer will see two images of a scene, one above the other.

In order to adjust the mirror M3 for the desired distance corresponding to a given zone as set up by the Hammer method, a hinged connection for the mirror is provided as shown at H in Fig. 3, the hinge H being tensioned so that the mirror mounting presses against a push rod A. A push plate B is disposed at the left end of the rod A and is operated by a plurality of projecting conical screws, as indicated at D for example, which are mounted on a polygonal index shaft C which is journaled on its longitudinal axis. The sides of the shaft C carry correction indicia with each of the sides corresponding to a given distance and position of the mirror M3. The instrument is calibrated by sighting an object at each of the distances so that the object appears in an upper and lower position simultaneously in the eye piece. What is desired is a measure of the angle corresponding to a given distance for a given zone as described, and the average height above a line corresponding to the ground surface immediately below the instrument. If the instrument is positioned at A in Figure 4, examination of the lines in dot and dash will show that this angle is $$\arctan \frac{ha \pm hi}{d}$$

The markings on the shaft C provide corrections for a range of elevations for each of the distances, and a specific elevation correction is selected by a level G and an arm F pivotally mounted on the eye piece 18 by means of a bracket 24, the axis of the arm F being designated by letter I. To this end, the eye piece 18 can be pivoted to focus on an object at a given distance and elevation by means of a pivot 25, and when the level is centered, an indexing line 26 will coincide with the correction.

The readings for each distance are taken at equally spaced angular intervals, the number of readings being greater for greater distances as described. So that a correct number of sightings may be made in equal angular relation to one another for each predetermined distance the instrument 10 is pivoted on a spindle plate 28 which is indented so that the desired number of points may be in register with corresponding indentations on an index plate 30 having corresponding notches for each distance and a knurled boss 32 to facilitate adjustment. A detent 34 is fixedly secured below the pivot 25 and is adapted to engage successive registered notches of the stationary plate 28 and index plate 30 during sightings at a given distance. As stated, this distance is determined by the setting for the shaft C also.

The instrument 10 does not require accurate leveling adjustments before the readings are made because of the fact that the readings include the leveling operation on the line of sight at the time they are made. Upon completion of all the readings, the corrections are added, and this sum is applied to the readings which have been made for gravity without the need for further complicated calculation.

Although I have herein described my invention with respect to certain details, it will be understood by those skilled in the art that these may be varied without departing from the spirit and scope of the invention as set forth in the hereunto appended claims.

I claim as my invention:

1. In combination with a coincidence range finder of the type having opposed coaxial telescopes joined by a perpendicularly aligned eyepiece, with pentamirror systems in the outer ends of each of the telescopes, and a pivotally mounted mirror in one of the penta systems of one of the telescopes, a distance adjustment means and index member comprising an elongated rod journaled in axial alignment on said eyepiece, said rod defining a plurality of axially extending polygonally arranged index faces each bearing gravity correction indicia, means connecting said pivotally adjustable mirror and said rod so that rotation of the rod changes the position of the mirror in accordance with predetermined distance settings corresponding to the rotational position of the rod and each of the faces thereof, a level mounted on said eyepiece in pivotal relationship in a plane parallel to the axis of the eyepiece, a depending index bracket carrying an index line fixedly secured to the level, said level and index line cooperating with said rod so that when the range finder, its adjustable mirror, and said rod are set for a given distance in accordance with a selected face of the rod, and the range finder carrying the level is at an angle relative to the horizontal, the level and line may be moved manually so that the level is in horizontal position, the line coacting with the rod and the selected face thereof to coincide with an index marking on the face corresponding to a gravity correction.

2. In combination with a coincidence range finder of the type having opposed coaxial telescopes joined by a perpendicularly aligned eyepiece, with pentamirror systems in the outer ends of each of the telescopes, and a pivotally mounted mirror in one of the penta systems of one of the telescopes, a distance adjustment means and index member comprising an elongated rod journaled in axial alignment on said eyepiece, said rod defining a plurality of axially extending polygonally arranged index faces each bearing gravity correction indicia, means connecting said pivotally adjustable mirror and said rod so that rotation of the rod changes the position of the mirror in accordance with predetermined distance settings corresponding to the rotational position of the rod and each of the faces thereof, a level mounted on said eyepiece in pivotal relationship in a plane parallel to the axis of the eyepiece, a depending index bracket carrying an index line fixedly secured to the level, said level and index line cooperating with said rod so that when the range finder, its adjustable mirror, and said rod are set for a given distance in accordance with a selected face of the rod, and the range finder carrying the level is at an angle relative to the horizontal, the level and line may be moved manually so that the level is in horizontal position, the line coacting with the rod and the selected face thereof to coincide with an index marking on the face corresponding to a gravity correction, said range finder being mounted for horizontal rotational movement and angular movement in the vertical plane, and a base plate structure supporting the range finder for said movement including a circular index structure defining notches around its circumference corresponding to predetermined distance settings, said range finder carrying a detent adapted to engage the notches to position the range finder for successive sightings.

References Cited in the file of this patent

UNITED STATES PATENTS

| | | |
|---|---|---|
| 1,166,824 | Eppenstein | Jan. 4, 1916 |
| 1,283,943 | Sperry | Nov. 5, 1918 |
| 1,322,751 | Barr et al. | Nov. 25, 1919 |
| 2,023,313 | Carlo et al. | Dec. 3, 1935 |
| 2,294,195 | Miller | Aug. 25, 1942 |